(12) United States Patent
Mendelsohn et al.

(10) Patent No.: US 8,723,724 B2
(45) Date of Patent: May 13, 2014

(54) GROUND ASSISTED SATELLITE ANTENNA POINTING SYSTEM

(71) Applicant: ViaSat, Inc., Carlsbad, CA (US)

(72) Inventors: Aaron Mendelsohn, Alamo, CA (US); Mark Miller, San Marcos, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 13/842,346

(22) Filed: Mar. 15, 2013

(65) Prior Publication Data

US 2014/0022120 A1 Jan. 23, 2014

Related U.S. Application Data

(60) Provisional application No. 61/673,150, filed on Jul. 18, 2012.

(51) Int. Cl.
H04B 7/185 (2006.01)
(52) U.S. Cl.
USPC ............................ 342/355; 342/354; 342/367
(58) Field of Classification Search
USPC .......... 342/352, 354, 355, 359, 367; 455/427, 455/429, 430
See application file for complete search history.

(56) References Cited

U.S. PATENT DOCUMENTS

| | | | | |
|---|---|---|---|---|
| 4,418,350 A * | 11/1983 | Rosen | ............................ | 342/359 |
| 4,599,619 A | 7/1986 | Keigler et al. | | |
| 4,910,524 A * | 3/1990 | Young et al. | ................... | 342/354 |
| 5,258,764 A * | 11/1993 | Malinowski | ................... | 342/359 |
| 5,697,050 A | 12/1997 | Wiedeman | | |
| 5,758,260 A * | 5/1998 | Wiedeman | ..................... | 455/12.1 |
| 6,150,977 A | 11/2000 | Wilcoxson et al. | | |
| 6,236,361 B1 * | 5/2001 | Rosen | ............................ | 342/359 |
| 6,930,636 B2 * | 8/2005 | Fowell | ........................... | 342/359 |
| 7,130,578 B2 | 10/2006 | Jarett | | |
| 7,154,439 B2 * | 12/2006 | Westall | .......................... | 342/358 |
| 7,195,204 B2 * | 3/2007 | Lloyd | ......................... | 244/129.1 |
| 2004/0203444 A1 | 10/2004 | Jarett | | |
| 2005/0007275 A1 | 1/2005 | Fowell et al. | | |

FOREIGN PATENT DOCUMENTS

EP 1160913 A2 12/2001

OTHER PUBLICATIONS

ISA/EP, Notification of Transmittal of the International Search Report and the Written Opinion of the International Searching Authority dated Sep. 26, 2013, Int'l Patent App. No. PCT/US2013/051129 to ViaSat, Inc., 11 pgs.

* cited by examiner

*Primary Examiner* — Cassie Galt
(74) *Attorney, Agent, or Firm* — Holland & Hart LLP

(57) ABSTRACT

Methods, systems, and devices are described for orienting a satellite antenna. In the methods, systems, and devices of the present disclosure, a satellite may provide multiple spot beams, each of the spot beams associated with a specific coverage area. The satellite may also transmit a wide beam downlink signal over a wide area beam having a coverage area that includes each of the spot beams. The satellite may receive an uplink beacon signal. The satellite antenna may be positioned according to azimuth and elevation determined from ground measurements of the spot beams and the satellite measurements of the uplink beacon signal.

16 Claims, 9 Drawing Sheets

GROUND ASSISTED SATELLITE ANTENNA POINTING SYSTEM

CROSS-REFERENCE

The present application claims priority to U.S. Provisional Patent Application Ser. No. 61/673,150, filed Jul. 18, 2012, entitled "GROUND ASSISTED SATELLITE ANTENNA POINTING SYSTEM," which is incorporated herein by reference in its entirety for all purposes.

BACKGROUND

The present disclosure relates to satellite communications in general, and in particular, to the positioning of satellite antennas.

As demand for satellite communications continues to grow, the use of spot beams in satellite systems has become increasingly popular. A spot beam is a modulated satellite beam focused on a limited geographic region of the Earth. By reducing the coverage area of the beam, a more directional antenna may be used by the satellite to transmit the beam to Earth. This higher gain associated with a spot beam may produce better signal-to-noise (SNR) ratio at a user terminal, which allows for higher rates of data transfer between the satellite and terminal. Also, the smaller size of spot beams allows for frequency reuse with limited inter-beam interference, thereby providing for even greater increases in data throughput at a satellite.

While spot beams can be very useful in areas of high demand, they may be susceptible to pointing errors. Satellite antenna movement within even a few thousandths of a degree may substantially change the coverage area of a spot beam on the earth. Moreover, it is often the case that multiple spot beams are transmitted in a predetermined pattern from the satellite to various intended coverage areas. Thus, an antenna pointing error at the satellite may detrimentally reduce the quality of communications over multiple spot beams simultaneously.

SUMMARY

Methods, systems, and devices are described for combining of ground measurements of spot beam signal strength and on-board measurements of an uplink beacon to identify satellite antenna pointing errors and adjust the position of the satellite antenna to correct the pointing errors.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described for ground assisted satellite antenna pointing. In the methods, systems, and devices of the present disclosure, an autotrack controller or other component of a satellite may use ground measurements of spot beam strength and/or uplink beacon measurements to adjust the positioning of a satellite antenna and reduce pointing error.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
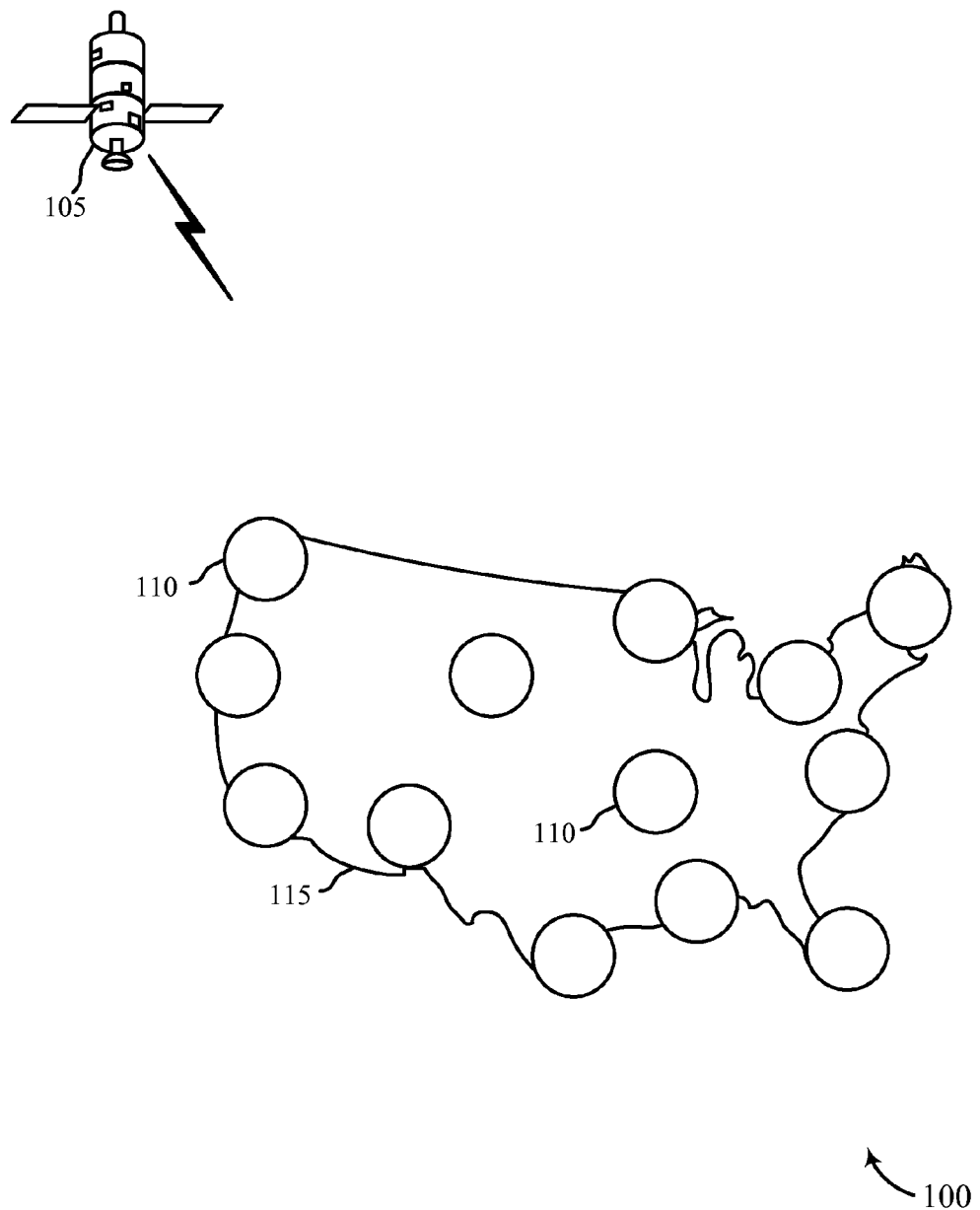
FIG. 1 is a diagram of an example satellite system providing communication services to the earth using spot beams according to various embodiments of the principles described herein.

Systems, devices, methods, and software are described for combining ground measurements and measurements at a satellite to adjust an orientation of a satellite antenna. FIG. 1 illustrates an example of a system 100 in which a satellite 105 orbiting the earth provides communication services to various regions of the earth 115 using a number of spot beams 110.

For the sake of simplicity, thirteen spot beams 110 are shown. Nevertheless, it will be appreciated that the satellite 105 may be able to provide many more spot beams. In certain examples, the satellite 105 may be configured to provide a number of overlapping spot beams such that substantially all of the continental United States or another region of the earth may be covered by at least one of the spot beams 110. Moreover, while the spot beams 110 shown in FIG. 1 are of a uniform size, the same satellite 105 may be used to provide spot beams 110 of varying sizes to the earth 115.

Multiple terminals equipped with receiver equipment may be located within the coverage area of a spot beam 110 and receive modulated data from that particular spot beam 110. Because the use of spot beams 110 increases data throughput capacity at a satellite through frequency reuse and reduction of interference, a satellite 105 may employ a large number of spot beams 110 to communicate with the earth. Because each spot beam 110 may be directed to a specific region, the satellite 105 may in some examples maintain a geostationary orbit such that the position of the satellite 105 with respect to the surface of the earth remains substantially constant. However, even when the satellite 105 maintains a geostationary orbit, the spot beams 110 may become misaligned with their intended coverage areas due to pointing errors. These pointing errors may result from a number of factors including, but not limited to, satellite attitude errors, thermal gradients, thruster firings and other satellite maneuvering.

FIGS. 2A-2D are diagrams 200 of various example spot beam alignments that may result from different types of pointing errors. The spot beams 110 of FIGS. 2A-2D may be examples of the spot beams 110 described above with reference to FIG. 1.

Figure 2A:
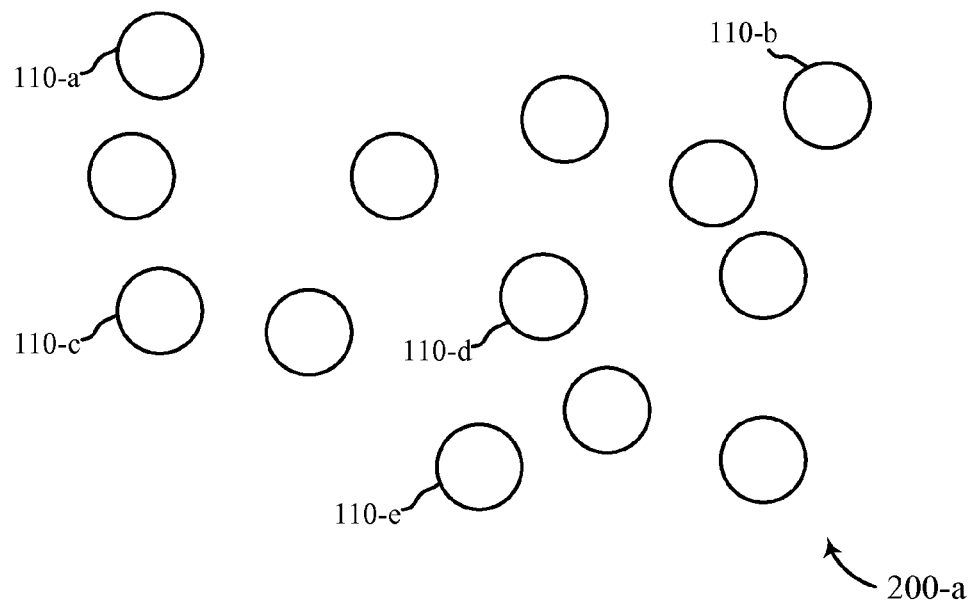
FIGS. 2A-2D are each diagrams of examples of spot beam alignment resulting from different satellite antenna orientations, according to various embodiments of the principles described herein.

FIG. 2A shows an example in which the spot beams 110 are in substantially perfect alignment with their respective intended coverage areas. As such, the satellite antenna producing the spot beams 110 has substantially no pointing errors.

Figure 2B:
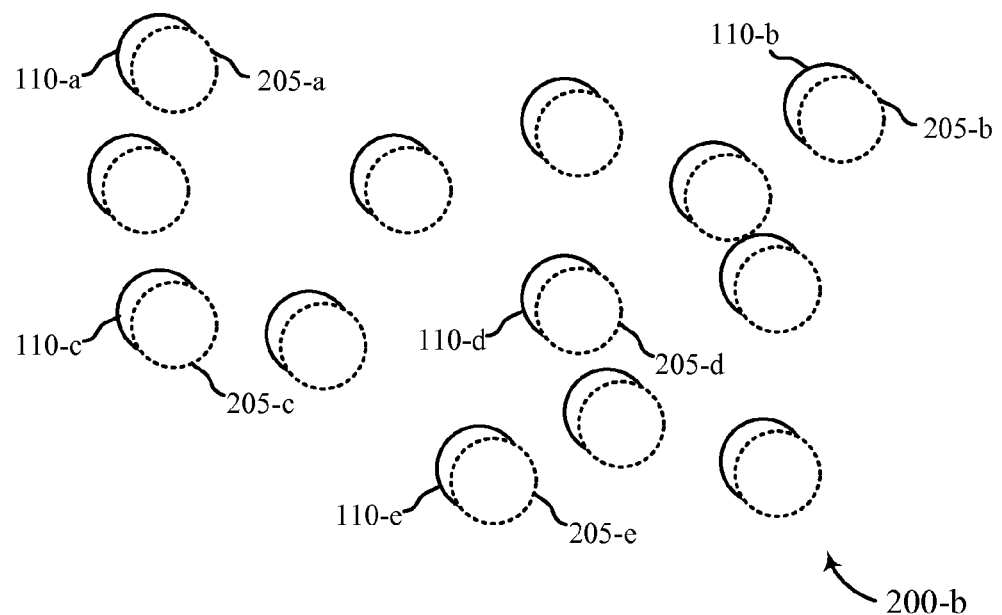

FIG. 2B shows an example in which the spot beams 110 are offset up and to the left from their respective intended coverage areas 205, which may be indicative of an azimuth and elevation error at the satellite antenna. Such an error may result in terminals within the intended coverage areas 205 of the spot beams 110 being unable to receive the data from the spot beams 110.

Figure 2C:
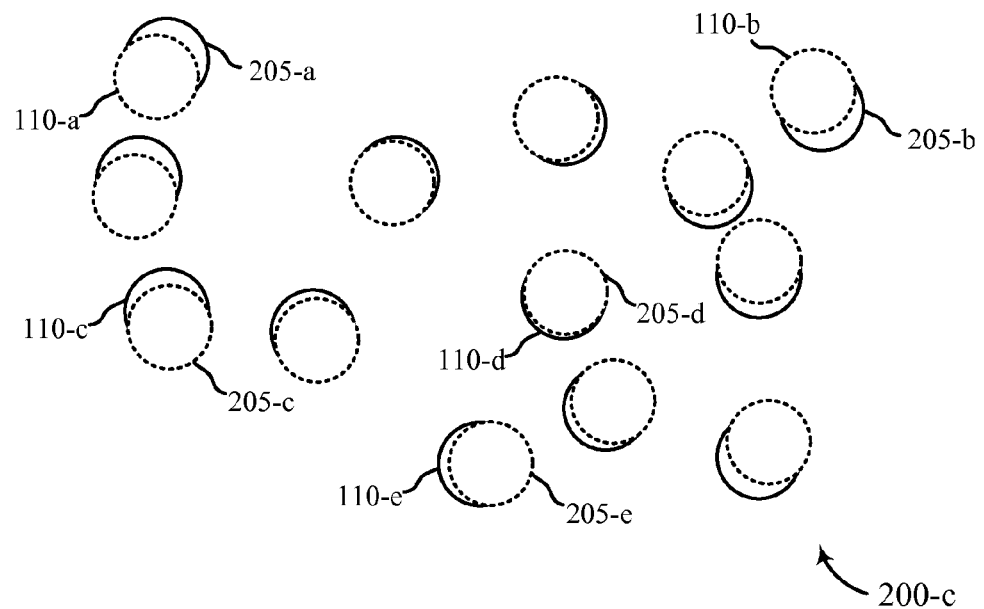

FIG. 2C shows an example in which the placement of the spot beams 110 is rotated counterclockwise from the placement of their respective intended coverage areas 205. This rotation may indicate a yaw error in the attitude of the satellite body. In certain examples, a satellite body yaw error may not be easily remedied by adjustments to the elevation and azimuth of the satellite antenna. For instance, as shown in the example of FIG. 2C, the yaw error may result in certain spot beam 110-*a* being offset to the right of its intended coverage area 205-*a*, while spot beam 110-*e* is offset to the left of its intended coverage area 205-*e*. Thus, an adjustment to the azimuth and elevation of the antenna to compensate for the misalignment of spot beam 110-*a* may exacerbate the misalignment of spot beam 110-*e*.

Figure 2D:
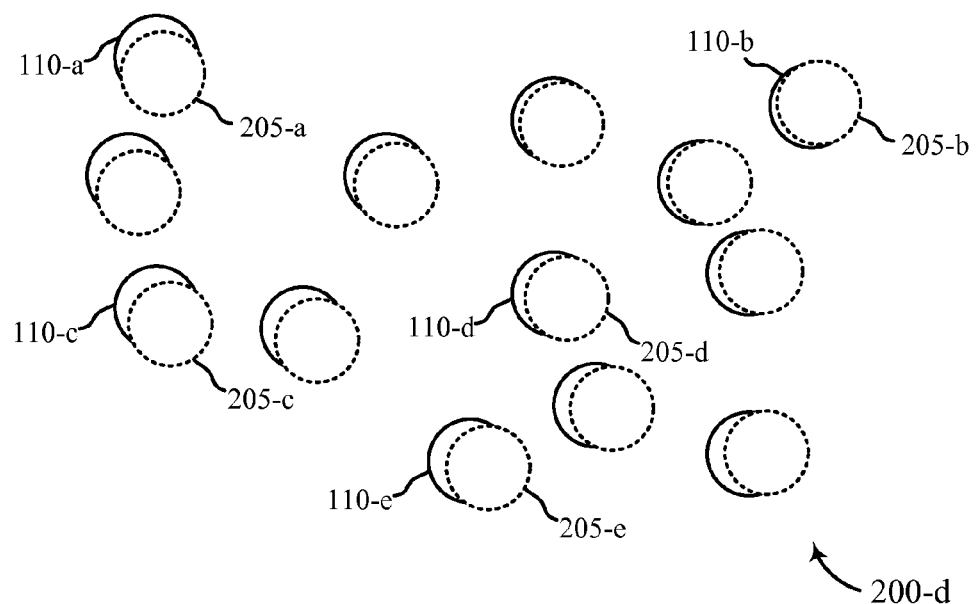

FIG. 2D shows an example in which the placement of the spot beams 110 has been misaligned from the placement of the intended coverage areas 205 by an azimuth/elevation error of the satellite antenna with respect to the satellite body, and a yaw error of the attitude of satellite body. This type of combined pointing error may not always be effectively remedied by adjusting either the attitude of the satellite body or the azimuth/elevation of the satellite antenna with respect to the satellite body. Rather, a more effective correction of pointing errors that are composite in nature may be had through determining adjusting both the attitude of the satellite body and the azimuth/elevation of the satellite antenna with respect to the satellite body. To accomplish this type of correction, error signals based on a combination of ground-based measurements and on-board measurements may be used.

Figure 3:
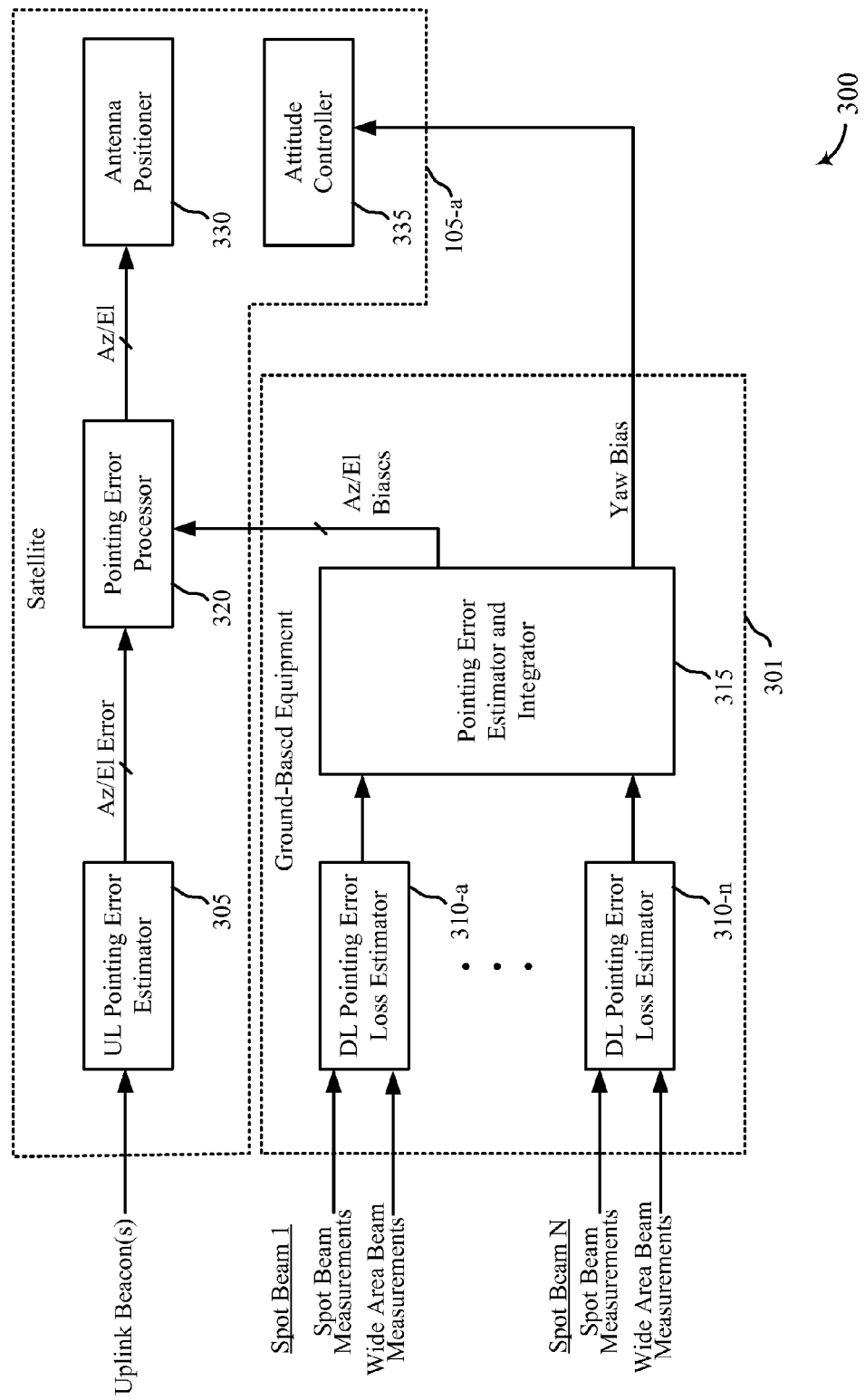
FIG. 3 is a block diagram of an example autotrack controller module 325 according to various embodiments of the principles described herein.

FIG. 3 is a block diagram of a system 300 for orienting a satellite antenna. The system 300 may include an uplink pointing error estimator 305, a number of downlink pointing error loss estimators 310, a pointing error estimator and integrator 315, and a pointing error processor 320. Each of these components may be implemented by one or more application-specific integrated circuits (ASICs) and/or by one or more processors executing computer-readable program code.

In the present example, the functionality of the system 300 may be distributed between the satellite 105-*a* and the ground-based equipment 301, as illustrated by the dashed lines. In other examples, one or more of the components shown here as implemented on the satellite 105-*a* may be instead implemented on the ground-based equipment 301, and one or more components shown here as implemented on the ground-based equipment 301 may be instead implemented on the satellite 105-*a*.

The uplink pointing error estimator 305 may generate, based on a position, direction, or strength of an uplink beacon received from the ground, uplink azimuth and elevation error signals for the satellite antenna.

Additionally, separate downlink pointing error loss estimators 310 may estimate pointing errors for individual spot beams based on the signal strength of each spot beam as measured at a number of ground measurement terminals within the coverage area of that spot beam. The signal strength of the spot beam may be measured at each ground measurement terminal with reference to a wide beam downlink signal transmitted over a wide area beam to account for fading of the spot beam signals that is unrelated to satellite antenna pointing errors.

Thus, for each ground measurement terminal that receives a spot beam, a normalized signal strength of the spot beam may be obtained by comparing the actual measured signal strength of the spot beam to the actual measured signal strength of the wide area beam at that location. The wide area beam may carry an unmodulated or PN modulated reference signal that originates at the satellite, and may be transmitted to the Earth using a horn antenna. The normalized signal strengths collected at the ground measurement terminals may be compared to each other to infer satellite antenna pointing errors for each of the spot beams, and the pointing error estimator and integrator 315 may determine downlink azimuth, elevation, and yaw bias signals for the satellite antenna based on the errors determined for the individual spot beams.

In certain examples, the ground measurement terminals may include user terminal (UT). The pointing errors (Azimuth, Elevation) of the satellite spot beam antenna as well as the spacecraft yaw error can be estimated by measuring the level of the received signals at each of many user terminals (UT's) in the coverage area. Each UT will receive and measure the level of two different signals: the downlink beacon signal and the communications signal. An example downlink beacon signal is an unmodulated or PN modulated signal that originates at the satellite and is transmitted down to the Earth using a beam with a very large coverage area, typically a horn antenna. The coverage area (and thus beam diameter) of the beacon antenna is sized to provide coverage to all UTs that are going to participate in the pointing error estimation process. This would generally be a coverage area that includes all of the spot beam areas. The communication signal may be a revenue bearing forward link communication signal from the GW to the UTs within a spot beam. This forward link communication signal originates at the GW location and is received, amplified and frequency translated by the satellite and transmitted back down to the Earth by a narrow beamwidth spot beam antenna.

The azimuth and elevation errors of the spot beam antenna will affect the received level of the communications signal. Also, the spacecraft yaw error will affect the received level of the communications signal due to the narrow beamwidth of the spot beam. Spacecraft pitch and roll errors also affect the received level, but these errors can be corrected by antenna azimuth and elevation corrections. Thus, these errors are absorbed into the antenna Az and El errors. However, due to the much larger beamwidth of the horn antenna used to provide the beacon downlink, the received level of the downlink beacon, as measured by each UT, is insignificantly affected by the azimuth and elevation pointing errors of the spot beam antenna or the spacecraft yaw error. By generating the ratio of the received level of the two signals (or the difference when the levels are converted to dBs) and examining the ratios (or differences when in dB) observed by all the UTs, the Az, El, and Yaw errors can be accurately estimated. The EIRPs or relative EIRPs of the beacon signal and the communications signal do not need to be known. In the context of these examples, the azimuth, elevation, and yaw error for each spot beam may be generated as follows.

In certain examples, the satellite may include a multi beam antenna system with a single reflector used to generate the spot beams with a feed array. A subset, which may be the entire set, of these spot beams may be used in the error estimation process. In the following examples, let the number of beams in this subset be J. These spot beams may be numbered 1 to J. Each participating spot beam may now have K UTs within its coverage area. The UTs in each participating spot beam may be numbered 1 to K. An individual UT may be uniquely specified by a beam index, j, and UT within the beam index, k.

For UT k in beam j, denoted as UT(j,k), the received level of the downlink beacon signal may be defined as $$R^b_{j,k} = P^b + G^b_j - L_{j,k} + G^{UT}_{j,k} \qquad (1)$$

In (1) all units are in dBs. Pb is the beacon transmitter power in dBW. This value may not need to be known.

$G^b_j$ is the satellite beacon antenna gain (dBi) in the direction of beam j. Due to the narrow beamwidth of the spot beam, this parameter should not change significantly over the region of the spot beam coverage. Hence this parameter may be considered to not be a function of k. Rather, $G^b_j$ is known from satellite antenna pattern measurements performed during the satellite construction process. $L_{j,k}$ is the propagation loss (dB) to UT(j,k), and includes free space propagation as well as propagation impairments such as rain and scintillation. $L_{j,k}$ does not need to be known.

$G^{UT}_{j,k}$ is the terminal gain for UT(j,k), and includes antenna gain, low noise amplifier (LNA) gain, and other gains or losses before the power measurement device.

$G^{UT}_{j,k}$ also does not need to be known.

Similarly, the received level of the communication signal for UT(j,k) may be defined as $$R^s_{j,k} = P^s_j + G^s_{j,k}(\varepsilon_{Az}, \varepsilon_{El}, \varepsilon_{Yaw}) - L_{j,k} + G^{UT}_{j,k} \qquad (2)$$

Here $L_{j,k}$ and $G^{UT}_{j,k}$ may use the same values as in (1). This approximation can be made when the frequency of the wide area beam is close to the frequency of the communication signal. For example, the wide are abeam frequency may be a CW beacon near the edge of the communication spectrum, or by using a direct sequence spread spectrum signal that overlaps the communication signal spectrum.

$P^s_j$ is the transmitter power of transponder j in dBW. The power may be different from transponder to transponder, hence the dependence on j. Note that for a communication signal originating from the gateway, factors such as uplink power control error and imprecisely known transponder output backoff may contribute to $P^s_j.$ The value for $P^s_j$ does need to be known.

$G^s_{j,k}$ is the spot beam antenna gain of transponder j to UT(j,k). This value is a function of the errors $\varepsilon_{Az}, \varepsilon_{El}$ and $\varepsilon_{Yaw}$. These errors may be unknown.

A UT may make Rx power estimates or SNR estimates of the downlink beacon and the communications signal using standard estimation techniques. Converting the measurements to dBs and differencing yields the relative measurement, $$RM = P^s_j - P^b - G^b_j + G^s_{j,k}(\varepsilon_{Az}, \varepsilon_{El}, \varepsilon_{Yaw}) + N_{j,k} \qquad (3)$$

The first three terms in (3) represent an unknown constant. This constant is the same for every UT in beam j, but may be different for each of the j beams. This constant is notated as Cj. The last term in (3), $N_{j,k}$ represents noise in the signal measurement process, and each UT participating in the estimation process may have a different value of $Nj_{,k}$.

The spot beam antenna gain to UT(j,k) may be a nonlinear function of the unknown errors $\epsilon_{Az}$, $\epsilon_{El}$ and $\epsilon_{Yaw}$. For small values of these errors, which may be the case during normal operation, this non-linear function may be expressed with a linear approximation, $$G^s_{j,k}(\epsilon_{Az}, \epsilon_{El}, \epsilon_{Yaw}) = G^s_{j,k}(0, 0, 0) + a_{j,k}\epsilon_{Az} + b_{j,k}\epsilon_{El} + c_{j,k}\epsilon_{Yaw} \quad (4)$$

where the coefficients $a_{j,k}$, $b_{j,k}$, and $c_{j,k}$ are the partial derivatives of the spot beam antenna gain, $$G^s_{j,k},$$

with respect to the errors, evaluated with zero error. Namely, $$a_{j,k} = \left.\frac{\partial G^s_{j,k}}{\partial \epsilon_{Az}}\right|_{\epsilon_{Az}=\epsilon_{El}=\epsilon_{Yaw}=0} \quad (5)$$

$$b_{j,k} = \left.\frac{\partial G^s_{j,k}}{\partial \epsilon_{El}}\right|_{\epsilon_{Az}=\epsilon_{El}=\epsilon_{Yaw}=0}$$

$$c_{j,k} = \left.\frac{\partial G^s_{j,k}}{\partial \epsilon_{Yaw}}\right|_{\epsilon_{Az}=\epsilon_{El}=\epsilon_{Yaw}=0}$$

The parameter $$G^s_{j,k}$$

(0,0,0) is the spot beam antenna gain for spot beam j in the direction of UT(j,k) with zero pointing error. This quantity may be known from measurement of the satellite antenna patterns during the test phase of the satellite construction process. Similarly the partial derivatives in (5) may be evaluated from the measured satellite antenna patterns. Thus (4) expresses the spot beam gain in the direction of UT(j,k) as a linear combination of the three unknown error quantities with all of the coefficients known. The relative measurement made by a UT may therefore be modeled as $$RM = C_j + G^s_{j,k}(0, 0, 0) + a_{j,k}\epsilon_{Az} + b_{j,k}\epsilon_{El} + c_{j,k}\epsilon_{Yaw} + N_{j,k} \quad (6)$$

When the measurements by all the UTs in all J beams are considered, there are J+3 unknown parameters in the system. These unknowns are the J constants, $C_j$, and the errors $\epsilon_{Az}$, $\epsilon_{El}$ and $\epsilon_{Yaw}$. An estimate of the J+3 unknown quantities can be determined using the method of Least Squares as described below.

Each UT may provide a relative measurement. In the present example, the parameter m, 1≤m≤M=K*J is used to indicate the relative measurement made by UT number m. Note that UT index m implies a specific value for j (beam number) and k (UT with the beam). The vector of unknown quantities may be defined as $$w=[C_1, C_2, \ldots, C_J, \epsilon_{Az}, \epsilon_{El}, \epsilon_{Yaw}]^T \quad (7)$$

and the vector of known coefficients for UT(j,k), in beam j as $$x(m)=[0, \ldots, 1, \ldots, 0, a_{j,k}, b_{j,k}, c_{j,k}]^T \quad (8)$$

For UTs in beam j, the vector in (8) has zeros in components 1 thru J except position j (corresponding to beam j) which has a value of 1. For each UT in the estimation process, the quantity d(m) may be calculated from the relative measurements, $$d(m) = RM(m) - G^s_{j,k}(0, 0, 0) \quad (9)$$

Then the Least Square estimate of the unknown parameters is given by $$w = \Phi^{-1}\theta \text{ where } \Phi = \sum_{m=1}^{M} x(m)x^T(m) \text{ and } \theta = \sum_{m=1}^{M} x(m)d(m) \quad (10)$$

Neither the beacon EIRP nor the communications signal EIRP need to be known to generate accurate estimates of the three errors. Furthermore, the EIRP of the communications signals for all the beams need not be the same or known. This feature is what enables the use of the communications signal as the second signal in the measurement process. Use of the communication signals with an unknown EIRP in each beam, adds J more unknown parameters to the system of equations. However these J additional unknowns are absorbed into the unknown parameter vector, w, as part of the LS model formulation. With two or more UT's in each beam (each UT is at a different location within the beam), there are sufficient observations to enable a solution to the LS problem. More UT's per beam and use of more beams increases the accuracy of the estimate. For broadband multimedia systems there are a very large number of UTs (hundreds or thousands). As such, obtaining accurate estimates may be a matter of finding enough terminals with significant $a_{j,k}$, $b_{j,k}$, and $c_{j,k}$ to use for the estimate.

Figure 4A:
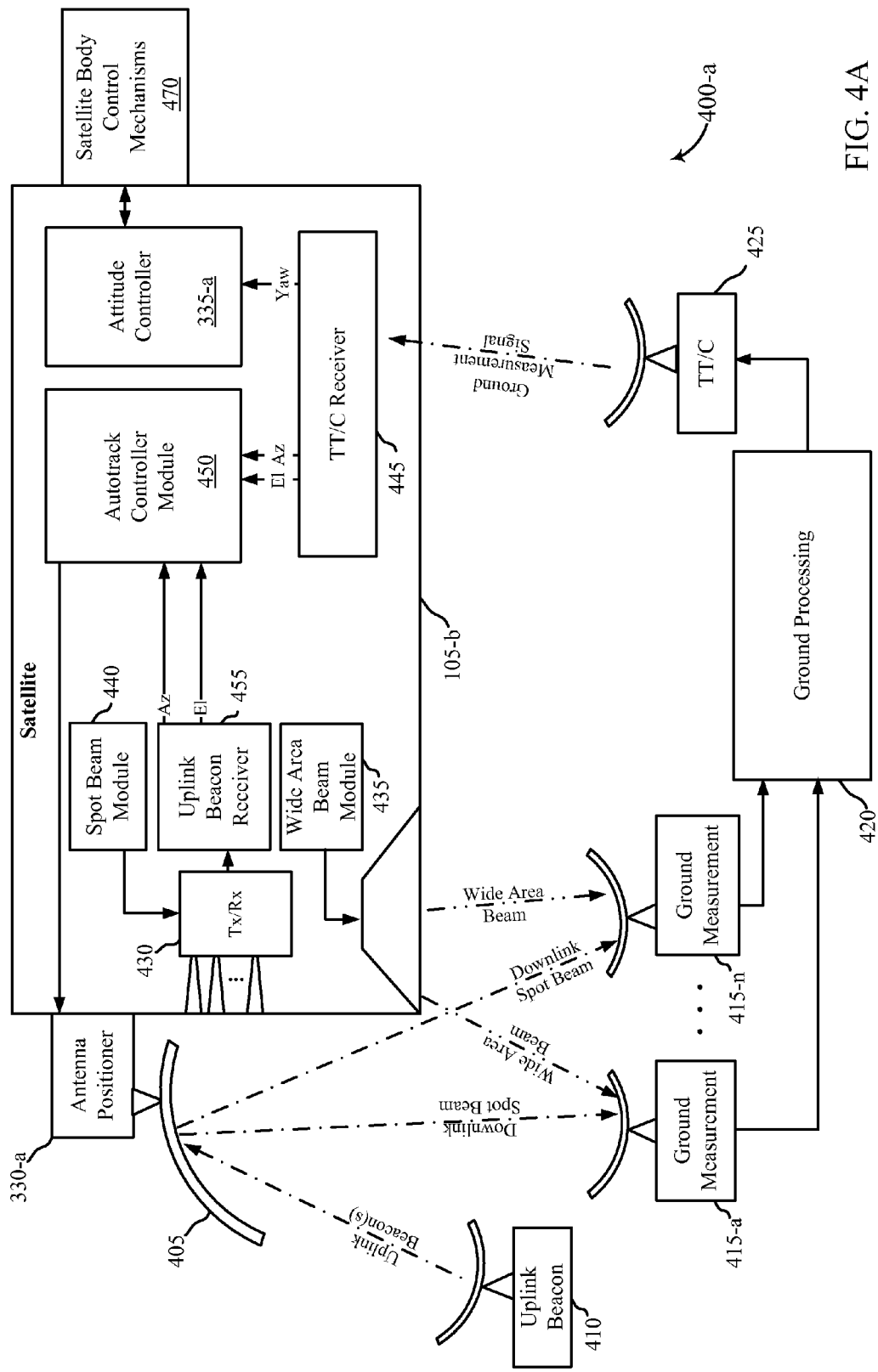
FIGS. 4A & 4B are diagrams of example systems for ground assisted satellite antenna pointing according to various embodiments of the principles described herein.

FIG. 4A illustrates an example of a system 400-a for positioning an antenna 405 of a satellite 105-b based on ground measurements of spot beam signal strength and satellite measurements of an uplink beacon, according to the principles described above. The system 400-a of FIG. 4A may include the satellite 105-b with its associated antenna 405, an uplink beacon terminal 410, a plurality of ground measurement terminals 415, a ground processing station 420, and a telemetry, tracking, and control (TT/C) terminal 425. As used herein, the term "antenna" 405 encompasses reflectors. The satellite 105-b may be an example of one or more of the satellites 105 described above with reference to the previous Figures. The ground measurement terminals 415 may, in certain examples, be user terminals (UTs).

In the present example, the spot beam module 440 of the satellite 105-b may generate a number of downlink spot beam signals and transmit the downlink spot beam signals to the Earth over a number of spot beams. The spot beams may be transmitted by a spot beam transmit/receive feed cluster module 430 and the antenna 405 to the user terminals 415 over their respective spot beams. A wide area beam module 435 of the satellite 105-b may generate a wide beam downlink reference signal and transmit the wide beam downlink reference signal over a wide area beam using a horn antenna. The ground measurement terminals 415 may measure the signal strength of their respective spot beam signals in comparison to the signal strength of the wide area beam signal received over the wide area beam.

The ground measurement terminals 415 may transmit the signal strength measurements taken of the spot beam signals, with reference to the wide area beam, to the ground processing station 420. In certain examples, the ground processing station 420 may compute azimuth, elevation, and yaw errors for the satellite antenna 405 based on the received spot beam signal strength measurements. The ground processing station 420 may then generate azimuth, elevation, and yaw bias signals for transmission to the satellite 105-b according to the principles described above. In certain examples, the ground processing station 420 may implement examples of the downlink pointing error loss estimators 310 and the pointing error estimator and integrator 315 of FIG. 3. Additionally or alternatively, the ground processing station 420 may condition the spot beam signal strength measurements for transmission to the satellite 105-b. The TT/C station 425 may transmit a ground measurement signal to a TT/C receiver 445 of the satellite 105-b. The ground measurement signal may include the measured spot beam signal strengths and/or ground-computed azimuth, elevation, and yaw biases for the satellite 105-b.

The TT/C receiver 445 may forward the azimuth and elevation components of the ground measurement signal to an autotrack controller module 450 of the satellite 105-b. The autotrack controller module 450 may implement an example of the pointing error processor 320 of FIG. 3. The autotrack controller module 450 may selectively combine the azimuth and elevation components of the ground measurement signal with azimuth and elevation errors computed at an uplink beacon receiver 455 based on an uplink beacon signal transmitted by the uplink beacon station 410. The uplink beacon receiver 455 may implement an example of the uplink pointing error estimator 305 of FIG. 3. Based on a total azimuth and elevation error computed from the selective combination of the uplink and downlink azimuth and elevation signals, the autotrack controller module 450 may communicate with an antenna positioner 330-a to adjust the azimuth and/or elevation of the satellite antenna 405 to compensate for the errors. Additionally or alternatively, in certain examples, the autotrack controller module 450 may control the positioning of the antenna 405 based on only one of the uplink errors or the downlink errors. The TT/C receiver 445 may additionally forward the yaw component of the ground measurement signal to an attitude controller 335-a of the satellite 105-b, which may communicate with satellite body control mechanisms 470 (e.g., reaction wheels, magnetic torque rods, thrusters, etc.) to adjust the yaw of the body of the satellite 105-b to compensate for a yaw error determined from the ground measurements.

While the ground measurement signal of the present example may carry azimuth, elevation, and yaw biases computed on the ground based on the ground measurements, it should be understood that in alternative examples, these biases may be calculated at the satellite 105-b. Thus, in one example, the ground measurement signal may include raw or condensed measurements from the ground measurement terminals 415, and the autotrack controller module 450 and the attitude controller 335-a may determine the downlink satellite positioning errors based on these measurements.

Figure 4B:
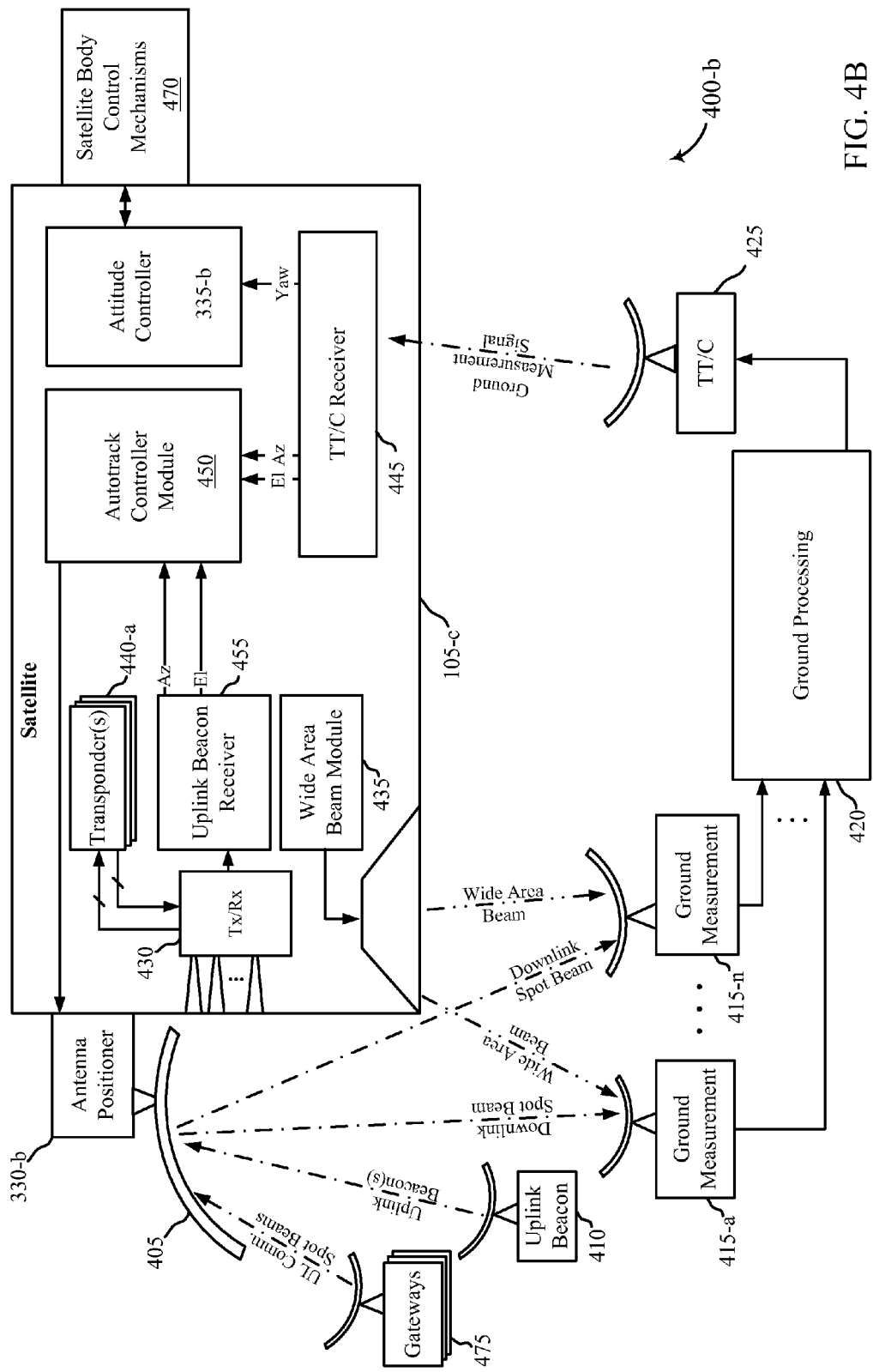

FIG. 4B illustrates an example of a system 400-b for positioning an antenna 405 of a satellite 105-c based on ground measurements of forward link communication signals transponded over spot beams by the satellite 105-c, according to the principles described above. The system 400-b of FIG. 4B may be an example of the system 400-a of FIG. 4A.

The system 400-b of FIG. 4B may include the satellite 105-c with its associated antenna 405, an uplink beacon terminal 410, a plurality of ground measurement terminals 415, a ground processing station 420, a telemetry, tracking, and control (TT/C) terminal 425, and a plurality of gateways 475. The satellite 105-c may be an example of one or more of the satellites 105 described above with reference to the previous Figures. The ground measurement terminals 415 may, in certain examples, be user terminals (UTs).

In the present example, the gateways 475 may transmit a plurality of uplink communication signals over uplink spot beams to the satellite 105-c. The uplink communication signals may be associated with a forward link between the gateways 475 and a number of UTs. The satellite 105-c may receive the uplink communication signals at the transmit/receive feed cluster module 430, and a number of transponders 440-a may transpond the uplink communication signals for transmission over a number of downlink spot beams to the ground measurement terminals 415. The transponders 440-a may be an example of the spot beam module 440 of FIG. 4A.

The wide area beam module 435 of the satellite 105-c may generate a wide beam downlink reference signal and transmit the wide beam downlink reference signal over a wide area beam using a horn antenna. The ground measurement terminals 415 may measure the signal strength of the downlink communication signals on their respective spot beam signals in comparison to the signal strength of the wide area beam signal received over the wide area beam.

The ground measurement terminals 415 may transmit the signal strength measurements taken of the spot beam signals with reference to the wide area beam to the ground processing station 420. The TT/C station 425 may communicate with the ground processing station 420 to transmit a ground measurement signal to a TT/C receiver 445 of the satellite 105-c. The ground measurement signal may include the measured downlink communication signal strengths of the different spot beams and/or ground-computed azimuth, elevation, and yaw biases for the satellite 105-c.

In certain examples, the satellite 105-c may rely only on the ground measurement signal to position the satellite antenna. In such examples, the ground measurement signal may include azimuth, elevation, and/or yaw error signals if the control signals are to be generated at the satellite 105-c. Alternatively, the ground processing station 420 may compute control signals for azimuth, elevation, and/or yaw based on the azimuth, elevation, and/or yaw errors computed on the ground, and the ground measurement signal may include the ground-generated control signals. Based on the azimuth, elevation, and yaw components of the ground measurement signal, the autotrack controller module 450 may cause the antenna positioned 330-b adjust the azimuth and elevation of the satellite antenna 405, and the attitude controller 335-b may adjust the yaw of the satellite 105-c.

In alternative examples, the satellite 105-c may rely on both the ground measurements of the downlink communication signals and satellite measurements of the received uplink beacon to position the satellite antenna 405. In such examples, the uplink beacon receiver 455 may provide azimuth and elevation error signals to the autotrack controller module 450, and the ground measurement signal may include azimuth and elevation bias signals based on the ground measurements. The yaw component of the ground measurement signal may be an error signal, a bias signal, or a control signal. Based on the ground measurement signal and the azimuth and elevation errors determined at the uplink beacon receiver 455, the autotrack controller module 450 may adjust the azimuth and elevation of the satellite antenna 405. Based on the yaw component of the ground measurement signal, the attitude controller 465 may adjust the yaw of the satellite 105-c.

Figure 5:
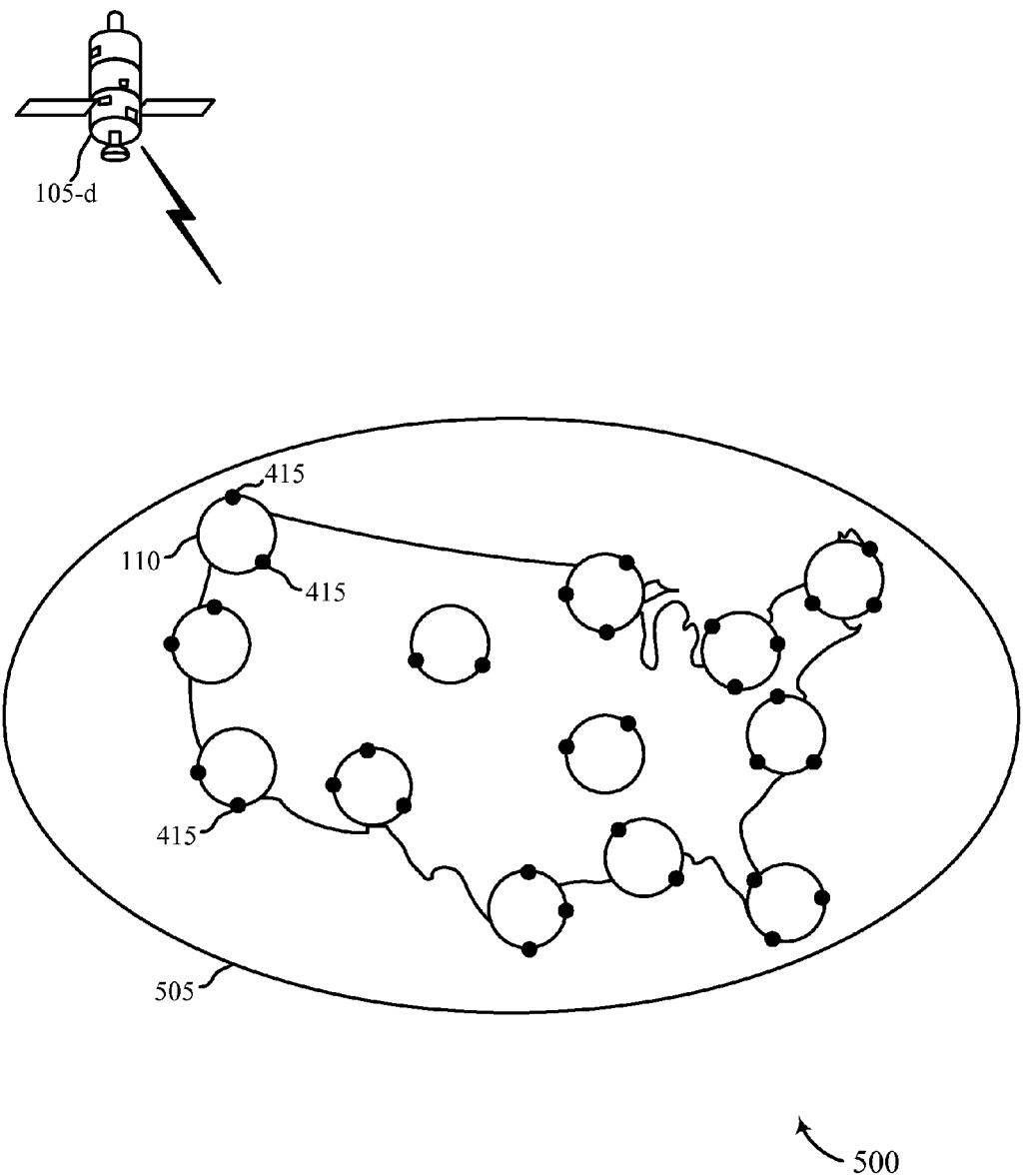
FIG. 5 is a block diagram of an example system for ground assisted satellite antenna pointing according to various embodiments of the principles described herein.

FIG. 5 is a diagram of another example system 500 for positioning an antenna of a satellite 105-d, according to the principles of the present disclosure. The system 500 may be an example of one or more of the systems described above with reference to the previous Figures. FIG. 5 illustrates the placement of ground measurement terminal stations 415 with respect to the intended coverage areas of a wide beam 505 and a number of spot beams 110 provided by the satellite 105-*d* to the earth 115.

Each of the ground measurement terminals 415 may be placed at an edge of the intended coverage area for its respective spot beam 110 (e.g., near the expected fringe area of the spot beam 110). In this way, the ground measurement terminals 415 may be more susceptible to measurable changes in signal strength of the spot beams 110 caused by subtle pointing errors associated with the antenna of the satellite 105-*d*. As described above, ground measurement terminals may be located in areas with elevated sensitivity to azimuth pointing errors, elevation pointing errors, or yaw errors. Additionally the spot beams 110 participating in ground-based measurements may be selected such that ground measurements are spread over a large part of the aggregate coverage area of the satellite.

Figure 6A:
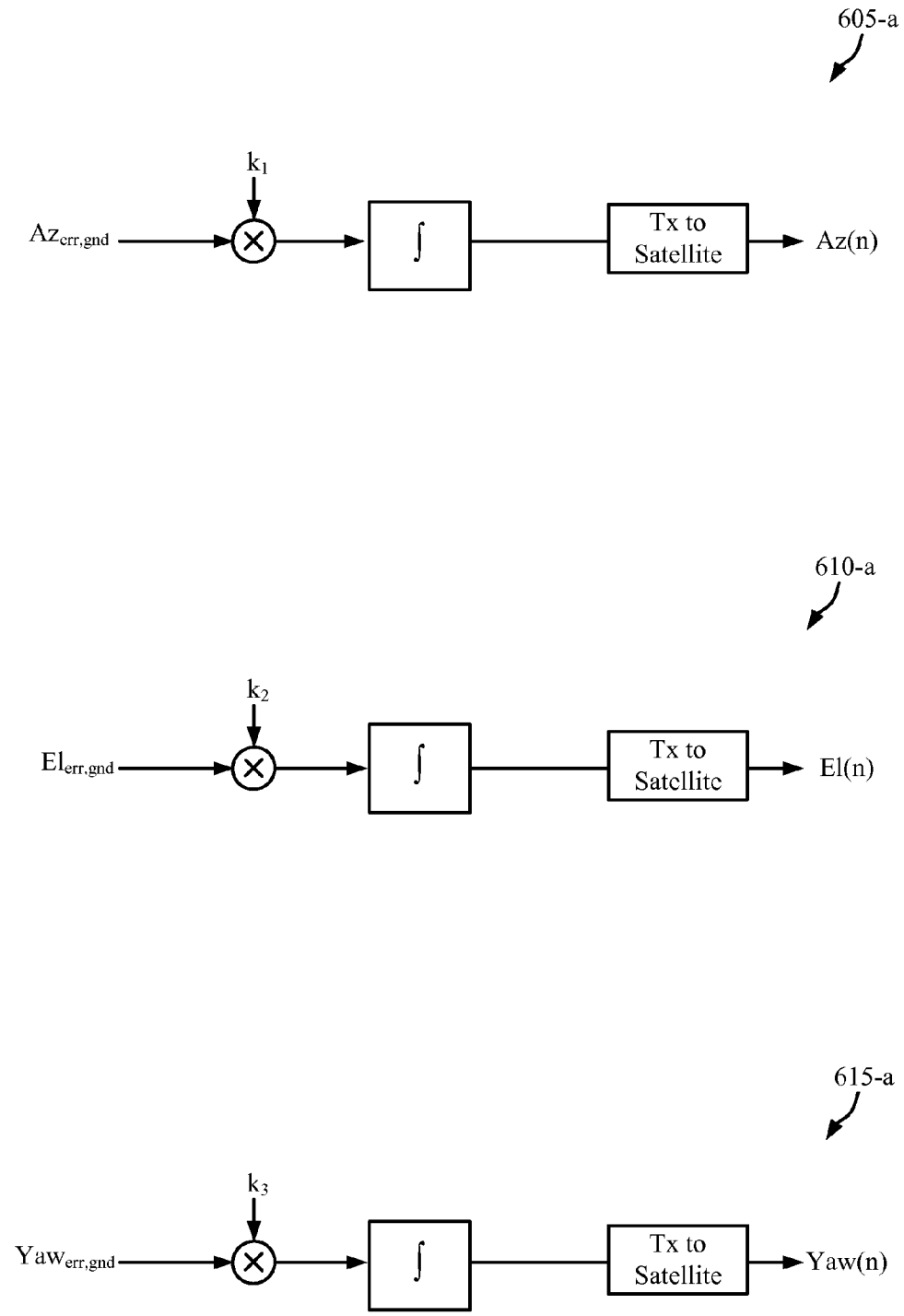
FIGS. 6A and 6B are block diagrams of example systems for selectively producing satellite antenna pointing correction signals according to various embodiments of the principles described herein.
Figure 6B:
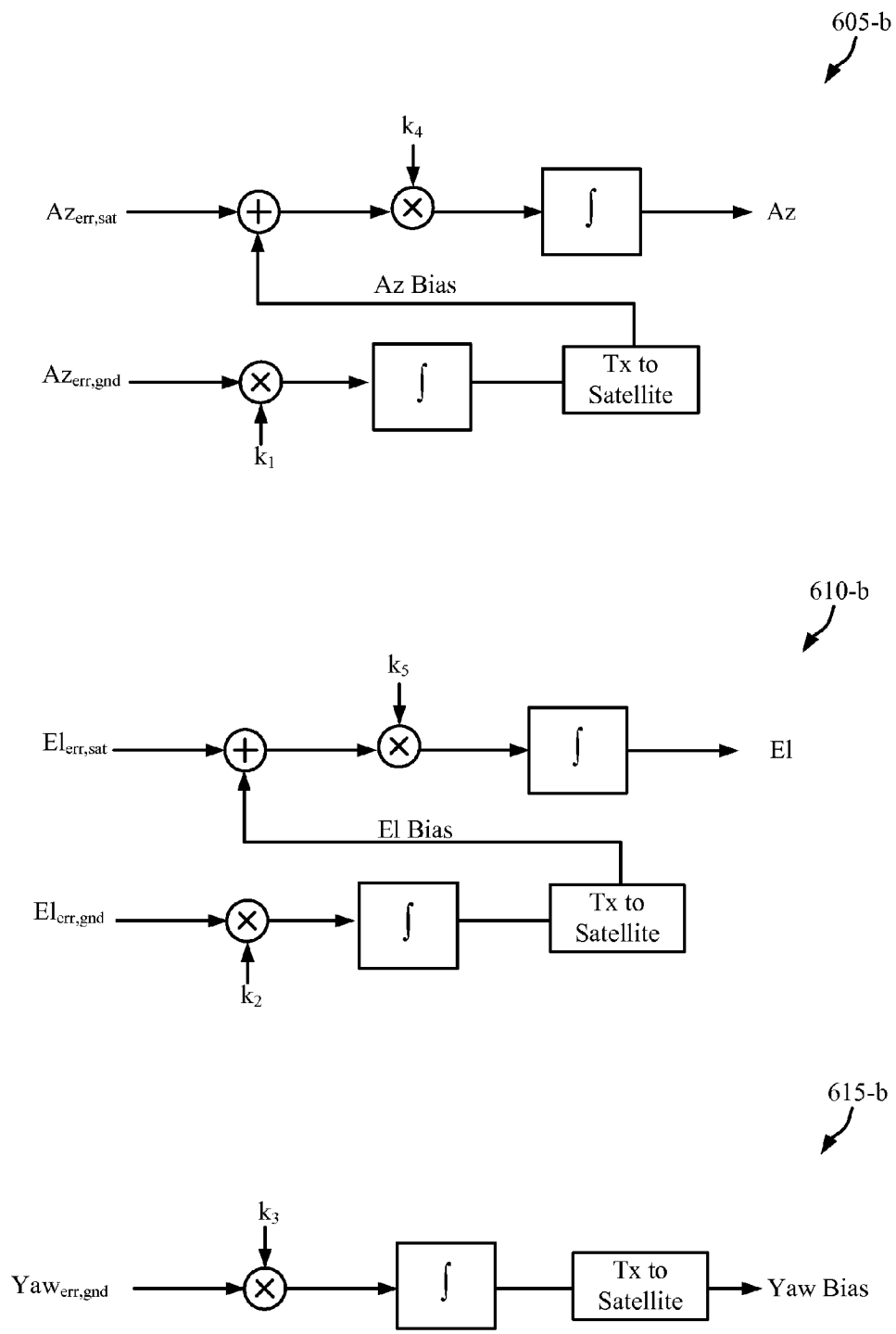

FIGS. 6A and 6B illustrate block diagrams of example circuitry that may be used to generate control signals for azimuth, elevation, and yaw (Az(n), El(n), and Yaw(n), respectively) to correct pointing errors associated with a satellite antenna according to the principles of the present disclosure. The circuitry includes an azimuth block 605, an elevation block 610, and a yaw block 615. In certain examples, the functionality of each of these blocks 605, 610, 615 may be divided between circuitry on-board the satellite and ground equipment. In particular, these blocks 605, 610, 615 may be implemented by at least one example of the pointing error estimator and integrator 315 of FIG. 3, the pointing error processor 320 of FIG. 3, the ground processing station 320 of FIGS. 4A-4B, and/or the autotrack controller module 450 of FIGS. 4A-4B. Integration of error signals may be performed to generate a control loop for each of the parameters.

In the example of FIG. 6A, azimuth, elevation, and yaw control signals may be generated on the ground based on the ground measurements only and transmitted to the satellite. Thus, an azimuth control block 605-*a* may generate the azimuth control signal Az(n), where n represents a time or window of time, by integrating the product of a constant $k_1$ and an azimuth error signal obtained from the ground measurements. Az(n) may then be transmitted to the satellite.

Similarly, an elevation control block 610-*a* may generate the elevation control signal El(n) by integrating the product of a constant $k_2$ and an elevation error signal obtained from the ground measurements. Yaw(n) may then be transmitted to the satellite Additionally, a yaw control block 615-*a* may generate the yaw control signal Yaw(n) by integrating the product of a constant $k_3$ and a yaw error signal obtained from the ground measurements. Yaw(n) may then be transmitted to the satellite.

In the example of FIG. 6B, a combination of ground measurements and uplink beacon measurements may be used to generate azimuth, elevation, and yaw control signals to position the satellite antenna. Measurements of an uplink beacon signal at the satellite may be used to generate raw azimuth ($Az_{err,sat}$) and elevation $El_{err,sat}$) errors. Signal strength measurements of the spot beams at the ground measurement terminals may generate raw azimuth ($Az_{err,gnd}$), elevation ($El_{err,gnd}$) errors, which may be used to create azimuth and elevation bias signals for transmission to the satellite. The signal strength measurements of the spot beams at the ground measurement terminals may additionally generate a yaw error signal ($Yaw_{err,gnd}$), which may be weighted by constant $k_5$, integrated, and transmitted to the satellite as a bias or control signal.

At the azimuth control block 605-*b*, the product of a constant $k_1$ and $Az_{err,gnd}$ may be integrated and transmitted to the satellite as an azimuth bias signal. The sum of the azimuth bias signal and $Az_{err,sat}$ may be multiplied by constant $k_4$ and integrated at the satellite to generate the Az(n) control signal.

Similarly, at the elevation control block 610-*b*, the product of a constant $k_2$ and $El_{err,gnd}$ may be integrated and transmitted to the satellite as an elevation bias signal. The sum of the elevation bias signal and $El_{err,sat}$ may be multiplied by constant $k_5$ and integrated at the satellite to generate the El(n) control signal Additionally, the yaw control block 615-*b* may generate the yaw bias signal by integrating the product of a constant $k_3$ and an yaw error signal obtained from the ground measurements. The yaw bias signal may then be transmitted to the satellite.

The loop gain constants $k_1$, $k_2$, $k_3$, $k_4$, and $k_5$ of FIGS. 6A and 6B may be chosen to determine the responsiveness of the control loops. In general, these constants may be relatively small to keep the loops stable in the presences of loop delays and depending on the responsiveness of the mechanisms for adjusting elevation, azimuth, and yaw.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method of orienting a satellite antenna, the method comprising:
    transmitting a plurality of downlink spot beam signals over a plurality of spot beams from a satellite, each of the spot beams associated with a specific coverage area;
    transmitting a wide beam downlink signal over a wide area beam from the satellite, the wide area beam associated with a coverage area that includes each of the spot beams;
    receiving an uplink beacon signal at the satellite;
    generating azimuth and elevation antenna pointing error signals using a measurement of the uplink beacon signal;
    generating azimuth and elevation antenna pointing bias signals using a plurality of spot beam signal strength measurements made at a plurality of ground measurement terminals, the spot beam signal strength measurements made relative to the wide beam downlink signal; and
    positioning the satellite antenna based at least in part on the azimuth and elevation antenna pointing error signals and the azimuth and elevation antenna pointing bias signals.

2. The method of claim 1, wherein the plurality of downlink spot beam signals comprise forward link communication signals.

3. The method of claim 1, wherein the plurality of downlink spot beam signals comprise beacon signals generated at the satellite.

4. The method of claim 1, further comprising:
    generating a yaw bias signal using a plurality of spot beam signal strength measurements made at a plurality of ground measurement terminals, the spot beam signal strength measurements made relative to the wide beam downlink signal; and
    controlling a yaw of the satellite based at least in part on the yaw bias signal.

5. The method of claim 4, further comprising:
    determining a first partial derivative of an antenna gain for each ground measurement terminal in the coverage area of at least one of the spot beams with respect to an azimuth error of that spot beam;
    determining a second partial derivative of the antenna gain for each ground measurement terminal in the coverage area of the at least one of the spot beams with respect to an elevation error of that spot beam; and
    determining a third partial derivative of the antenna gain for each ground measurement terminal in the coverage area of the at least one of the spot beams with respect to a yaw error of that spot beam.

6. The method of claim 5, further comprising:
    estimating the azimuth error, the elevation error, and the yaw error for the at least one of the spot beams based on the ground measurements made in the coverage area of the spot beam, the first partial derivative, the second partial derivative, and the third partial derivative,
    wherein azimuth and elevation antenna pointing bias signals are based at least in part on the estimated azimuth and elevation error for the at least one of the spot beams, and the yaw bias signal is based at least in part on the estimated yaw error for the at least one of the spot beams.

7. The method of claim 1, wherein at least one of the ground measurement terminals comprises a user terminal (UT).

8. The method of claim 1, wherein each of the ground measurement terminals is located substantially at an edge of one of the coverage areas associated with one of the spot beams.

9. A satellite antenna pointing system, comprising:
    a plurality of ground measurement terminals configured to generate a plurality of spot beam signal strength measurements for a plurality of spot beams, the spot beam signal strength measurements made relative to a wide beam downlink signal of a wide area beam;
    a processing station in communication with the ground measurement terminals, the processing station configured to generate azimuth and elevation antenna pointing bias signals based on the spot beam signal strength measurements made at the ground measurement terminals; and
    a satellite configured to:
        transmit the downlink spot beam signals over the plurality of spot beams, each of the spot beams associated with a specific coverage area;
        transmit the wide area beam downlink signal over the wide area beam, the wide area beam comprising a coverage area that includes each of the spot beams;
        generate azimuth and elevation antenna pointing error signals using a measurement of an uplink beacon signal;
        receive the azimuth and elevation antenna pointing bias signals from the processing station; and
        position an antenna of the satellite based at least in part on the azimuth and elevation antenna pointing error signals and the azimuth and elevation antenna pointing bias signals.

10. The satellite antenna pointing system of claim 9, wherein the plurality of downlink spot beam signals comprise forward link communication signals.

11. The satellite antenna pointing system of claim 9, wherein the plurality of downlink spot beam signals comprise beacon signals generated at the satellite.

12. The satellite antenna pointing system of claim 9, wherein:
    the processing station is further configured to generate a yaw bias signal using a plurality of spot beam signal strength measurements made at a plurality of ground measurement terminals, the spot beam signal strength measurements made relative to the wide beam downlink signal; and
    the satellite is further configured to control a yaw of the satellite based at least in part on the yaw bias signal.

13. The satellite antenna pointing system of claim 12, wherein the processing station is further configured to:
- determine a first partial derivative of an antenna gain for each ground measurement terminal in the coverage area of at least one of the spot beams with respect to an azimuth error of that spot beam;
- determine a second partial derivative of the antenna gain for each ground measurement terminal in the coverage area of the at least one of the spot beams with respect to an elevation error of that spot beam; and
- determine a third partial derivative of the antenna gain for each ground measurement terminal in the coverage area of the at least one of the spot beams with respect to a yaw error of that spot beam.

14. The satellite antenna pointing system of claim 13, wherein the processing station is further configured to:
- estimate the azimuth error, the elevation error, and the yaw error for the at least one of the spot beams based on the ground measurements made in the coverage area of the spot beam, the first partial derivative, the second partial derivative, and the third partial derivative,
- wherein the azimuth and elevation pointing bias signals are based at least in part on the estimated azimuth and elevation error for the at least one of the spot beams, and the yaw bias signal is based at least in part on the estimated yaw error for the at least one of the spot beams.

15. The satellite antenna pointing system of claim 9, wherein at least one of the ground measurement terminals comprises a user terminal (UT).

16. The satellite antenna pointing system of claim 9, wherein each of the ground measurement terminals is located substantially at an edge of one of the coverage areas associated with one of the spot beams.

* * * * *